US010257068B2

(12) United States Patent
Eikman et al.

(10) Patent No.: US 10,257,068 B2
(45) Date of Patent: Apr. 9, 2019

(54) WIRELESS COMMUNICATION SYSTEM FOR MOVING VEHICLES

(71) Applicant: ICOMERA AB, Göteborg (SE)

(72) Inventors: Viktor Eikman, Västra Frölunda (SE); Andreas Thunberg, Mölndal (SE); Aron Ulmestrand, Mölndal (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 15/309,325

(22) PCT Filed: May 7, 2015

(86) PCT No.: PCT/EP2015/060094
§ 371 (c)(1),
(2) Date: Nov. 7, 2016

(87) PCT Pub. No.: WO2015/169917
PCT Pub. Date: Nov. 12, 2015

(65) Prior Publication Data
US 2017/0214596 A1 Jul. 27, 2017

(30) Foreign Application Priority Data

May 8, 2014 (EP) .................................. 14167527

(51) Int. Cl.
H04Q 3/66 (2006.01)
H04W 40/36 (2009.01)
(Continued)

(52) U.S. Cl.
CPC .......... H04L 43/10 (2013.01); H04L 61/1511 (2013.01); H04L 61/2007 (2013.01);
(Continued)

(58) Field of Classification Search
CPC ......... H04L 43/10; H04L 67/12; H04L 61/15; H04L 61/20
See application file for complete search history.

(56) References Cited

U.S. PATENT DOCUMENTS 6,721,564 B1    4/2004 Kobayashi
8,351,926 B1 *  1/2013 Wright ................ G05D 1/0055
                                                340/945
(Continued)

FOREIGN PATENT DOCUMENTS

EP    1 175 757        1/2002
JP    2008-300976 A   12/2008

OTHER PUBLICATIONS

International Search Report (PCT/ISA/210) dated Jul. 6, 2015, by the European Patent Office as the International Searching Authority for International Application No. PCT/EP2015/060094.
(Continued)

Primary Examiner — Xavier Szewai Wong
(74) Attorney, Agent, or Firm — Buchanan Ingersoll & Rooney P.C.

(57) ABSTRACT

A method and system for wireless communication between a moving vehicle and a remote server through at least one external mobile network are disclosed. The at least one exterior mobile network provides at least two concurrently useable data links. The method includes: providing at least one router in the moving vehicle for receiving and transmitting wireless data communication to and from a stationary communication server outside the moving vehicle through the at least one exterior mobile network; evaluating the quality of the data links on a host layer by repeatedly sending requests arranged to trigger a determinable automated response to the stationary communication server via the data links, and measure the time until the triggered
(Continued)

automated responses are received; and assigning data streams to the data links at least partly based on the evaluated quality.

13 Claims, 4 Drawing Sheets

(51) Int. Cl.
- H04L 12/26 (2006.01)
- H04L 29/12 (2006.01)
- H04L 29/08 (2006.01)
- H04L 29/06 (2006.01)
- H04W 40/12 (2009.01)
- H04W 84/00 (2009.01)

(52) U.S. Cl.
CPC .............. *H04L 67/12* (2013.01); *H04L 69/26* (2013.01); *H04Q 3/66* (2013.01); *H04W 40/36* (2013.01); *H04L 67/42* (2013.01); *H04Q 2213/098* (2013.01); *H04Q 2213/141* (2013.01); *H04Q 2213/16* (2013.01); *H04Q 2213/201* (2013.01); *H04W 40/12* (2013.01); *H04W 84/005* (2013.01)

(56) References Cited

U.S. PATENT DOCUMENTS

| | | | |
|---|---|---|---|
| 2001/0049732 A1* | 12/2001 | Raciborski | G06F 17/30864 709/224 |
| 2008/0170508 A1* | 7/2008 | Popiak | H04L 1/24 370/252 |
| 2009/0013210 A1* | 1/2009 | McIntosh | H04L 41/0672 714/4.1 |
| 2009/0031025 A1* | 1/2009 | Lloyd | H04L 12/14 709/224 |
| 2011/0060831 A1* | 3/2011 | Ishii | H04N 7/181 709/224 |
| 2013/0114402 A1* | 5/2013 | Ould-Brahim et al. | H04L 43/0811 370/225 |
| 2013/0198737 A1* | 8/2013 | Ricci | G06F 13/14 717/174 |

OTHER PUBLICATIONS

Written Opinion (PCT/ISA/237) dated Jul. 6, 2015, by the European Patent Office as the International Searching Authority for International Application No. PCT/EP2015/060094.

* cited by examiner

WIRELESS COMMUNICATION SYSTEM FOR MOVING VEHICLES

TECHNICAL FIELD OF THE INVENTION

The present invention relates to a wireless communication system for moving vehicles.

BACKGROUND

In computer networking, there are many reasons why a client system may achieve a connection to a remote host system, but obtain poor performance with respect to that connection. Some of the metrics commonly used to indicate performance are packet loss (intermittent failure for packets of data to arrive), latency (round-trip response time, hence responsiveness) and throughput (overall rate of data transmission).

Numerous known solutions in computer networking technology conceal temporary problems by means of abstraction in software, creating an artificial scale separation. Internet protocol (IP) networking and numerous related inventions reduce inherent risks, principally by allowing a connection to be re-routed and re-established when seriously disturbed or broken, provided that there are alternative paths and that any congestion is temporary.

These normal tools to improve connection stability and performance under cover of abstraction, including timeouts built into the transmission control protocol (TCP), are optimized for the range of stabilities found in wired solutions. They are correspondingly maladapted to mobile, wireless communication. They achieve little in the simple case of a client being connected to its host through a single network node, such that all traffic must, in practice, be routed over a fixed path through that part of its journey, and any response must take the same path back. The slowest individual segment of such a path has the largest impact on overall performance.

Wireless wide-area network (WWAN) communication technologies, such as HSPA and LTE, often produce poor performance in spite of the normal tools. These technologies provide a wireless link between a client, such as a cell phone, and a base station. The base station, commonly called a cell tower, has a wired connection to other parts of the network operator's infrastructure. Because WWAN technologies require a wireless step in networking, the overarching network connection becomes susceptible to degradation from a variety of physical phenomena largely or wholly absent in wired communication. One example is the occurrence of Rayleigh fading as a result of movement in the radiophysical environment, such as when a cell phone (client) on a moving vehicle communicates with one or more base stations along the vehicle's route.

Many of the reasons why a wireless network connection may be poor are difficult or impossible for a single client to diagnose. For instance, there may be so many competing WWAN clients that each one is assigned a narrow channel of the radio spectrum licensed for the technology, or get bumped off to more distant base stations, producing a weaker signal. Only some modems permit a user to identify such congestion directly. As another example, the backhaul wire between the base station and the network operator's connection to core Internet infrastructure may be inadequate for the volume of traffic, forcing the network operator to apply some method of triage unknown to the client.

In particular, problems are present in moving vehicles, and in particular when multiple users/clients travel together on larger vehicles, such as buses, trains and the like. At the same time, there is today an increasing demand from passengers to be able to communicate through mobile phones and other handheld terminals when travelling on e.g. trains, and also to be able to get access to the Internet with laptops, PDAs etc. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains.

EP 1 175 757 by the same applicant describes a method whereby many of these weaknesses resulting from wireless communication may be overcome through the concurrent use of multiple links, including both wired and wireless technologies. Optimizations for performance and cost are mentioned. However, the aforementioned solution is often insufficient to obtain an optimal transmission performance. Trains and other moving vehicles often pass through areas with bad radio coverage, and present solutions are often unable to handle the required traffic.

There is therefore a need for an improved wireless communication system for moving vehicles, which provides better capacity utilization. Even though the above discussion is focused on trains, similar situations and problems are encountered in many other types of moving vehicles, and in particular moving passenger vehicles, such as buses, ships and airplanes.

SUMMARY OF THE INVENTION

It is therefore an object of the present invention to provide a method for wireless communication and a wireless communication system for moving vehicles which alleviates all or at least some of the above-discussed drawbacks of the presently known systems.

This object is achieved by means of a wireless communication method and system for a moving vehicle as defined in the appended claims.

According to a first aspect of the present invention, there is provided a method for wireless communication between a moving vehicle and a remote server through at least one external mobile network, said at least one exterior mobile network providing at least two concurrently useable data links, comprising:

providing at least one router in the moving vehicle for receiving and transmitting wireless data communication to and from a stationary communication server outside said moving vehicle through said at least one exterior mobile network;

evaluating the quality of said data links on a host layer by repeatedly sending requests arranged to trigger a determinable automated response to said stationary communication server via said data links, and measure the time until the triggered automated responses are received; and assigning data streams to said data links at least partly based on said evaluated quality.

In the context of the present invention, "host layer" refers to one of the higher levels in a communication system model, such as the layers 7-4, or even 7-5 in the OSI (Open System Interconnection) model, ISO/IEC 7498-1, thus excluding the physical layer, the data link layer and the network layer, and preferably also the transport layer.

The "router" is a networking router, which is a machine that forwards data packets between computer networks, on at least one data link in each direction.

"Data streams" are traffic in need of routing. A stream is in the context of the present application to be seen as any and all communication with a specific combination of ultimate source and ultimate destination IP addresses and network ports, or whatever the equivalent of this would be in a networking scheme where these identifiers are not used or not sufficiently distinguishing. A stream is "created" when any entity on one side of the system seeks to communicate with any entity on the other side, using any specific combination of ports. Packets in a stream need not be inspected. For the purposes of this invention, a stream may be considered "destroyed" an arbitrary period of time (seconds or tens of seconds) after data has ceased to flow in it.

"Requests arranged to trigger a determinable automated response" are any active sending of a request or other provocation across a network, through a specific link, with the expectation of receiving a predetermined response, and preferably under a timeout or corresponding safeguard. The specific implementation of such requests may vary, depending on what information that should be determined, communication protocols, target host location, the amount of traffic sent and solicited, and the precise limit set by the timeout function. Obviously, factors external to the individual test, such as the interval between repetitions of the same type of test, is also a potential subject of fine tuning.

The router may be a mobile access router, and preferably a mobile access and applications router. The router is preferably at least partly responsible for making the evaluation of quality and assignment of data streams.

The stationary communication server may be any server accessible through the exterior network, such as a DNS server, a gateway through which the communication from the moving vehicle is transferred, a content provider server, or the like.

Measurement of the time until the triggered automated responses are received may be performed in various ways. One way is to measure the exact time (latency) between sending the request and receiving the response. However, the time may also be determined by determining whether the response is received within one or several time frames. For example, it may be determined whether a response is received before a determined time out. This provides a rough estimate of the time. A finer estimate may be obtained by alteration of the time frame(s), by alteration of the size of the sent request, e.g. by adding extra padding, and the like.

The router and the remote server are preferably connected through a plurality of exterior mobile networks, which are simultaneously useable. Also, the router is preferably arranged to communicate with the communication server on at least two different data links (communication routes) having different characteristics, and to automatically separate the communication traffic between said data links based on the evaluation. The communication can be automatically optimized based on the evaluation, and also optionally on other conditions, such as price, speed, latency, etc. Thus, in addition to the evaluation, prioritizing and assignments may be made based on other static or dynamic parameters, such as signal strength and the like. Such further optimizations are per se known from EP 1 175 757 by the same applicant, said document hereby incorporated by reference. An automatic selection is then made among the available data links to use the most efficient combination. Hence, a seamless distribution of the data among the different data links is obtained.

The router may use any available data links, such as two or more of e.g. GSM, Satellite, DVB-T, HSPA, EDGE, 1×RTT, EVDO, LTE, WiFi (802.11) and WiMAX; and combine them into one virtual network connection. In particular, it is preferred to use data links provided through wireless wide-area network (WWAN) communication technologies.

The selection is preferably made once for each data stream. However, re-selection for data streams that have failed may also be made. Further, data streams may also be split among two or more data links, e.g. by transferring a first part of a data stream on one data link to begin with, and then continue the transfer of the rest of the data stream on another data link, based on a re-assignment decision. Re-selection and/or re-assignment may also be made based on other criteria than complete failure of the presently used data link, such as when the evaluated quality of the link presently used is significantly deteriorated, falls below a certain threshold, or the like.

The controller making the evaluation is preferably arranged on the moving vehicle. However, additionally or alternatively, the controller may also be arranged in the at least one exterior network, and e.g. be arranged within a gateway, as the one discussed in EP 1 175 757. However, unlike the solution presented in this patent, the present solution does not require the use of a gateway, although it is fully compatible with such a device.

The general idea underlying the present invention is two interlocking parts: Link evaluation, and routing optimization in reaction to said evaluation. The evaluation is made by evaluating the quality of said data links on a host layer by repeatedly sending requests arranged to trigger a determinable automated response to said stationary communication server via said data links, and measure the time until the triggered automated responses are received. It has been found that this is a very efficient way to determine the relevant characteristics of a data link empirically. The purpose of this is to detect and work around problems, not to diagnose them. The tests therefore work on the higher layers of abstraction—the host layers of the OSI model—to probe the soundness of the lower layers.

The test methods may be complemented by knowledge of the nominal maximum throughput (hereafter NMT) assigned to the hardware substrate of each data link, by type. For instance, the IEEE 802.3-2008 standard defines Gigabit Ethernet, which would have an NMT of approximately $10^9$ bits per second.

The empirical evaluation tests are repeated regularly. For example, a new instance of each test on each link would typically be started at intervals of a few seconds. These intervals may further be adjusted on the basis of probabilities that changes in the router's situation, such as its physical movement, have made older results irrelevant. However, tests should preferably not be run so often that the amount of data transferred by them significantly degrades the primary function of the router, through congestion.

The assignment of data streams to the data links at least partly based on the evaluated quality may occur in various ways. In a preferred embodiment, the available data links are connected to merit values, e.g. integer merit values, based on the evaluated quality, in turn based on the measured test results, and optionally also based on the nominal maximum throughput (NMT) of the links. Preferably, separate merit values are assigned in each direction of traffic to each link. Links may then be weighed against each other at least partly, and preferably entirely, by these merit values. Thus, in one embodiment, all streams to links may be assigned in linear proportion to the merit values of the links.

However, other and possibly more advanced assignment algorithms may be used as well. In the same way that several different empirical tests may be applied for evaluating the quality of the links, any of several different algorithms may be applied to carry out the assignment or reassignment of each stream based on said evaluated quality. Preferably, the assignment algorithm fulfills at least some, and preferably all, of the following criteria:

1. Assignment is superficially random or pseudo-random, insofar as two streams with contiguous source or destination port numbers are approximately as likely to be assigned to two different links, as would be two streams without this relationship. This feature improves the performance of applications that open multiple, contiguous ports.
2. Seen over time in varying conditions, the probability of assignment to a link is proportional to the merit value of that link as a fraction of the sum of all merit values at the time of the assignment. This feature adapts the routing to measured levels of performance.
3. The assignment is registered in such a way that the number of streams assigned to each link can be counted. Each assignment can be re-evaluated when circumstances call for it, e.g. when links disconnect completely or drop so far in merit value that a new assignment should be considered.

The present invention provides very efficient and dynamic use of the capacity of the available data links, and is also cost-efficient to implement and utilize. For example, the method/system of the invention needs no configuration beyond possible knowledge of NMT and the particulars of the tests to be applied, such as ICMP targets. It is highly international, because link evaluation takes place on the host layers, agnostic of local peculiarities. Similarly, it works with any type of data link that supports TCP/IP or any comparable protocol stack, in any combination. Further, since requests arranged to trigger a determinable automated response to said stationary communication server via the data links are quick and easy to measure, and can be repeated at relatively high frequency, the link assignment becomes very quick, dynamic and adaptive.

The evaluation of the quality of the links may be determined solely based on the measured responses to the requests sent out, and the assignment of data streams to the data links may be made solely based on this evaluated quality. However, other static or dynamic parameters may also be brought into consideration for evaluating the quality of the links and/or for making the assignments. For example, parameters such as costs assigned to the different links, bandwidth, signal quality (e.g. signal to noise ratio), number of streams being assigned to the links, etc may be considered. Parameters such as packet loss and throughput may also be considered. Information about such additional parameters may be determined by additional tests. However, information about these parameters may also be obtained from other sources. Similarly, the routing according to the present invention can take other factors into account, including more categorical considerations wherein available links are tiered, limiting the set of available links at any given moment, regardless of their merit values.

In case several tests are performed to evaluate link quality, such tests can be combined in any order, serially or in parallel.

The requests triggering a determinable automated response may be requests to a domain name system (DNS) server. A WWAN Internet service provider (ISP) will normally offer the addresses of one or more domain name system (DNS) servers, as an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

Alternatively, the request triggering a determinable automated response may use the ICMP protocol. In particular, it is preferred that the requests triggering a determinable automated response are ECHO_REQUEST datagrams, used to trigger an ECHO_RESPONSE from an arbitrary remote host. Further, the ECHO_REQUESTs may be provided with a variable amount of extra padding data. Such echo requests is often referred to as "ping" or "pinging".

Unpadded ICMP requests are likely to receive a very high priority, because ICMP is a standard test of network latency. When highly prioritized, it gives the illusion of good overall responsiveness, while payload data in other types of containers gets a lower priority and relatively poor performance in case of congestion. To provide further information, and to enable even better use of the available links, ICMP packets can be padded with extra bytes of data. This provides a simple, universally recognized method of loading down a link with a very precise burst of traffic, and timing the response. The fact that one and the same packet constitutes the load and is timed is the greatest virtue of this test, because it measures how heavy traffic on a link will actually be treated.

The evaluation is preferably made based on an average time for a predetermined number of requests to said stationary communication server via said data links for said automated response to be received, said predetermined number of requests preferably being in the range of 3-10 requests, such as 5 requests.

In case the time is measured by determining if a response is received within a certain time frame, or within certain time frames, the evaluation can be based on determination that a predetermined number of responses being obtained within one or several time frames.

The requests to said stationary communication server are preferably sent at least every 5 second, and preferably at least every 3 second, and more preferably at least every 1 second.

The frequency of sending requests to the stationary communication server may also be adjustable in accordance with at least one other quality parameter of the links. For example, the frequency may be adjusted in accordance with the magnitude and/or volatility of the signal-to-noise ratio (SNR) of the links. Thus, the frequency may be increased when the volatility of the SNR increases and/or when the SNR decreases, e.g. below a certain threshold. Correspondingly, the frequency may be decreased when the volatility is lower and/or when the SNR is higher. The adjustable frequency makes the evaluation and assignment steps more dynamic and adjustable when the SNR conditions are bad.

According to another aspect of the present invention, there is provided a wireless communication system for a moving vehicle, comprising:

at least one router in the moving vehicle for receiving and transmitting wireless data communication to and from a stationary communication server outside said moving vehicle through at least one exterior mobile network, wherein said at least one exterior mobile network provides at least two concurrently useable data links, and at least one controller arranged to evaluate the quality of said data links on a host layer, and to assign data streams to said data links at least partly based on said evaluated quality, wherein said evaluation is made on a host layer, and is based on measured times until automated response are received from requests arranged to trigger a determinable automated response repeatedly sent to said stationary communication server via said data links.

With this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles, such as busses and the like.

Figure 1:
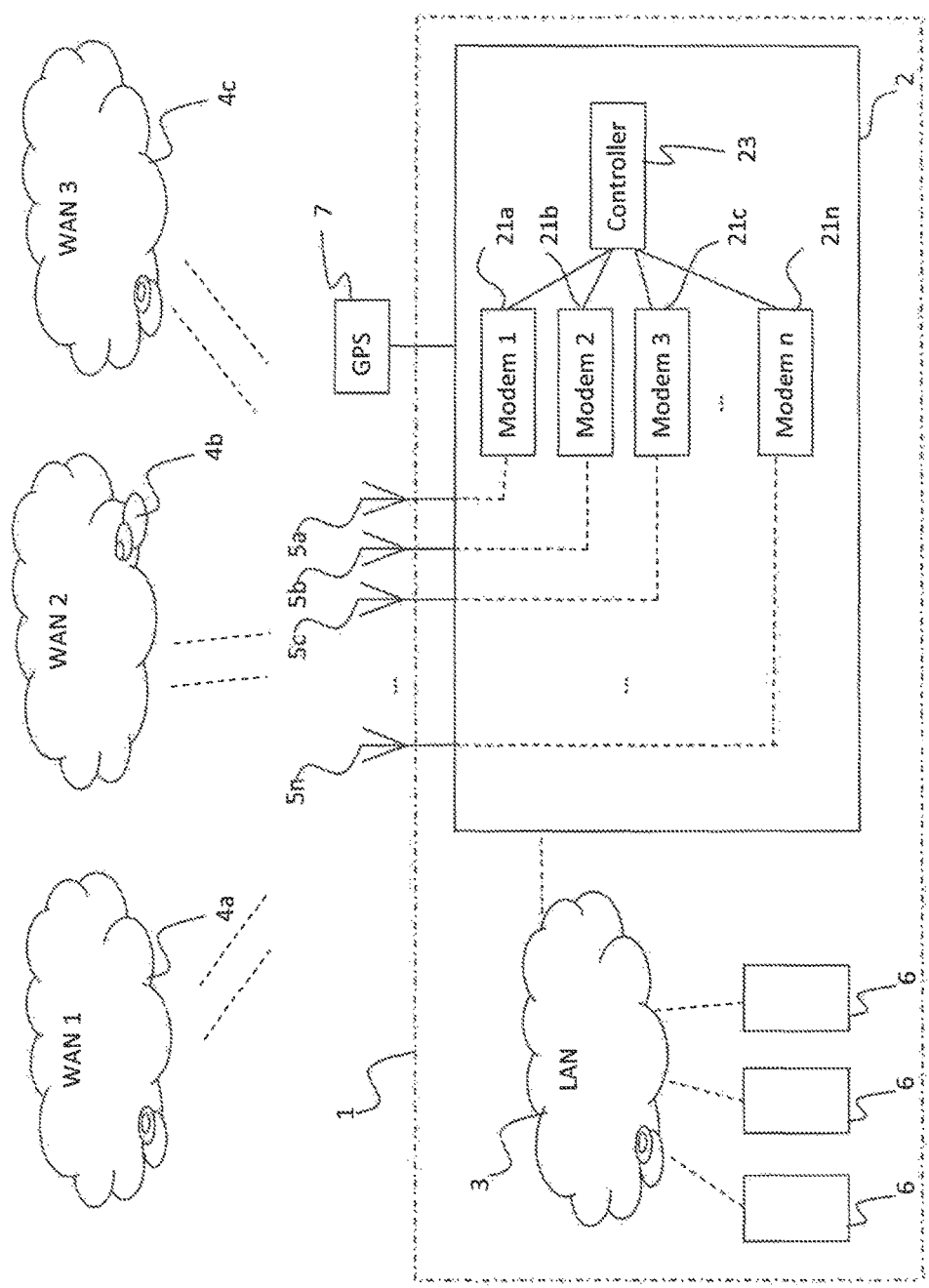
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Communication to and from the WANs is provided through one or several antennas 5 a-n on the vehicle roof. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs and so on.

The data communication router comprises a plurality of modems 21 a-n. Assignment of data streams to different WANs and/or to different data links on one WAN is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the vehicle, and wherein the controller may be arranged to assign data streams to various data links also partly in dependence on said received GPS signals.

The data communication router may also be denominated MAR (Mobile Access Router) or MAAR (Mobile Access and Applications Router).

The transferring of data streams through different data links comprises two main steps: evaluation and assignment. Each of these permits some variability. Numerous types of tests, generating a predictable response, such as an echo, could be performed to evaluate link quality, and such tests can be combined in any order, serially or in parallel. The following are only examples.

Any of a variety of common Internet functions can be taken to indicate the usefulness of a link. For example, a WWAN Internet service provider (ISP) will normally offer the addresses of one or more domain name system (DNS) servers, an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

If the queried DNS server belongs to the ISP, the latter will often indicate a severe problem at the ISP for that specific link. Because a DNS request typically consists of a single UDP or TCP packet going each way, this type of test is very light. The infrastructure typically prioritize DNS queries and DNS responses highly in traffic control algorithms, which is another reason why this type of test can be expected to complete very quickly, if at all. The timeout on it can therefore be set very low, producing high responsiveness. The lightness of a DNS test is both an advantage and, to some extent, a drawback. It detects qualitative problems, and is very quick. It also results in a low transfer of data, and does not strain the link, which in turn means that the tests can be repeated very frequently. However, because it does not strain the link, it is a poor indicator of quantitative performance.

Another example of an embodiment therefore uses the ICMP protocol. In this protocol, an ECHO_REQUEST datagram is used to elicit an ECHO_RESPONSE from an arbitrary remote host, preferably a very stable one.

In normal use, ICMP testing is light in the same way as DNS testing. In addition, it is easier for ISPs to prioritize ICMP in unknown ways, because it is a special protocol and does not represent an essential service. Unpadded ICMP requests are likely to receive a very high priority, because ICMP is a standard test of network latency. When highly prioritized, it gives the illusion of good overall responsiveness, while payload data in other types of containers gets a lower priority and relatively poor performance in case of congestion.

As part of the protocol, ICMP packets can be padded with extra bytes of data. This provides a simple, universally recognized method of loading down a link with a very precise burst of traffic, and timing the response. The fact that one and the same packet constitutes the load and is timed is the greatest virtue of this test, because it measures how heavy traffic on a link will actually be treated. In practice, there is often a substantial difference in how a stream of ICMP packets is treated, depending on their size. When padded packets fail to arrive under a given timeout, this is an indicator of performance problems.

The ICMP request may be sent to any type of stationary communication server accessible through the exterior network, such as a DNS server, a gateway through which the communication from the moving vehicle is transferred, a content provider server, or the like.

The two embodiments of methods for evaluation mentioned thus far can be generalized as one: any active sending of a request or other provocation across a network, through a specific link, with the expectation of receiving a response under a timeout or corresponding safeguard. Variations on this theme include factors such as protocol, target host location, the amount of traffic sent and solicited, and the precise limit set by the timeout function. Obviously, factors external to the individual test, such as the interval between repetitions of the same type of test, is also a potential subject of fine tuning.

The evaluation may follow the steps as outlined in FIG. 1, where the available data links are connected with merit values, e.g. integer merit values, based on the evaluated quality, in turn based on the measured test results, and optionally also based on the nominal maximum throughput (NMT) of the links. Preferably, separate merit values are assigned in each direction of traffic to each link.

Figure 3:
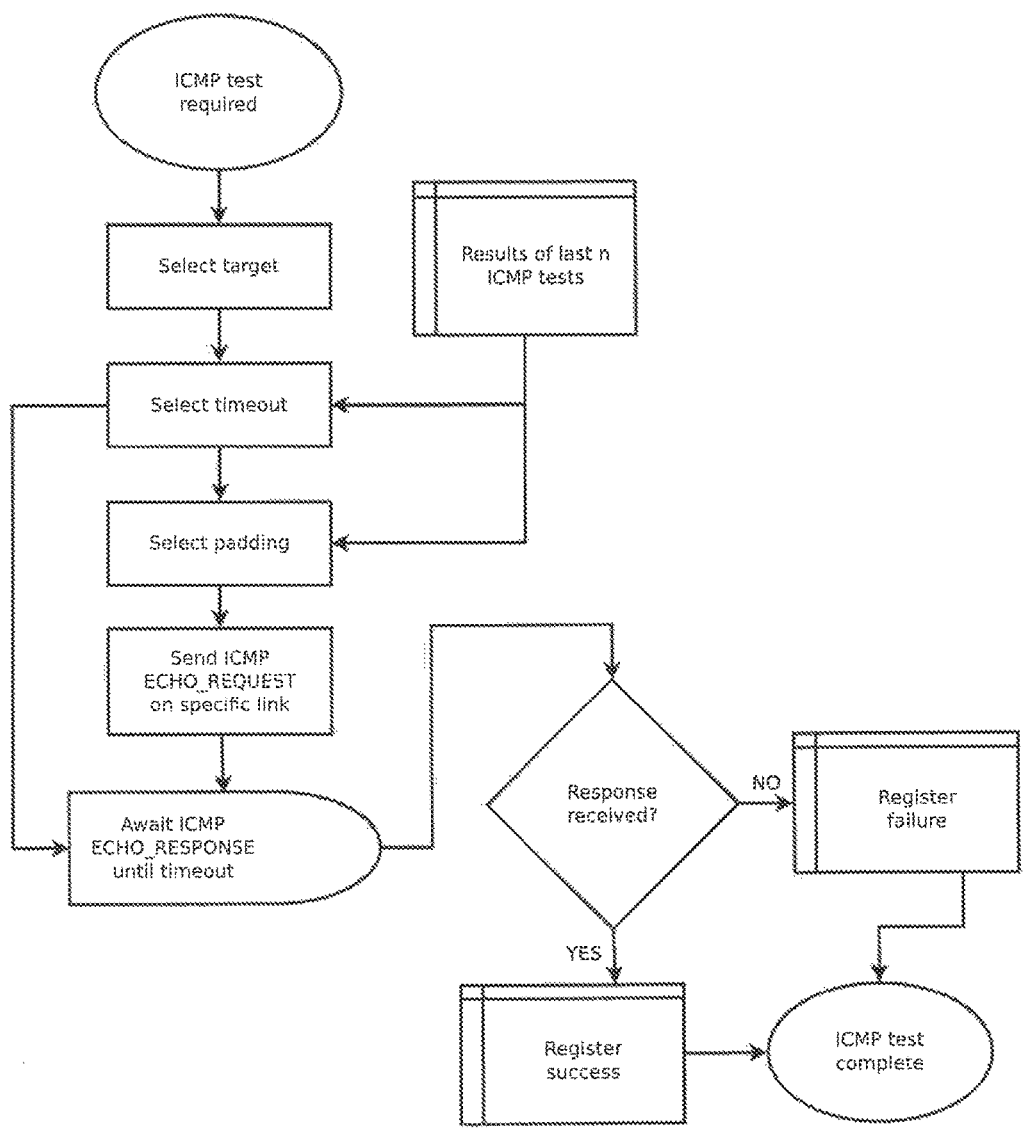
FIG. 3 is a schematic flow chart illustrating an evaluation sequence using adaptive padding in accordance with another embodiment of the present invention.
Figure 4:
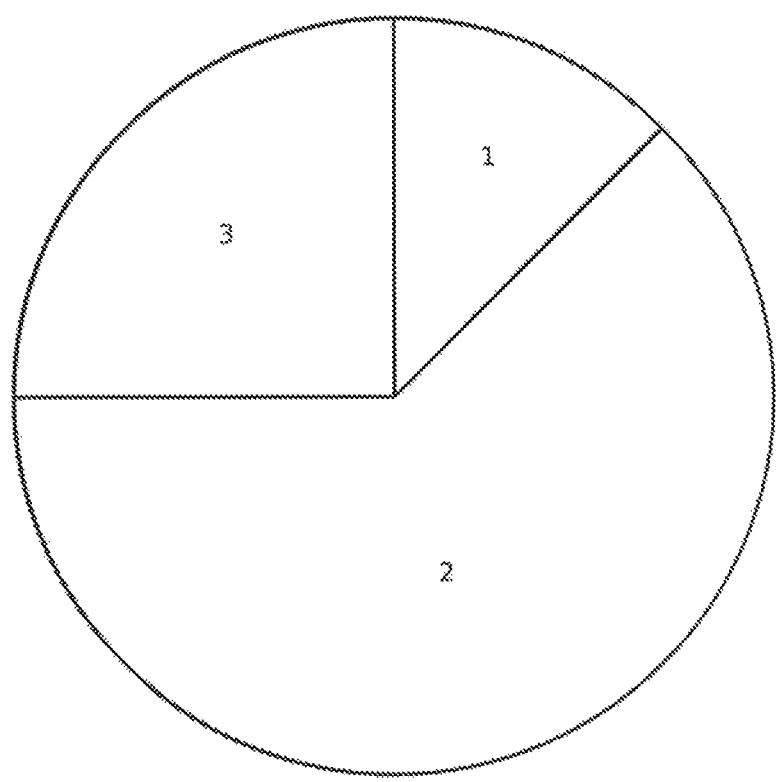
FIG. 4 is an illustration of the principle of link assignment in accordance with an embodiment of the present invention.

A further embodiment may also include some type of adaptive framework around one or more such variables. For instance, this could be a hysteretic influence upon the parameters of an ICMP test. FIG. 3 shows one example, where the size of the packet padding and the timeout imposed on the test are both set as a result of a simple analysis performed on the results of the last n previous tests of the same kind, on the same link.

Supposing that n=5, we may refer to the amount of successful tests in that set as s. We then let the timeout (in seconds) $t=13-2$ s and the padding (in whole bytes) $p=17000 \div 2^{(n-s)}$. In this concrete example, it follows that the first test (s=0) will take place with 531 bytes of padding under a timeout of 13 seconds. If this fails, the second test will be identical. If it succeeds (s=1), the next test will be harder, with 1063 bytes of padding under a timeout of 11 seconds, and so on. If the link performs perfectly, every iteration will eventually use 17000 bytes of padding and require an ICMP response in 3 seconds or less.

This example, where the difficulty of a test varies with each success and failure in recent memory, is applicable to a wide variety of link technologies. For example, older WWAN technologies like EDGE or UMTS are unlikely to pass the most difficult form of the test consistently or at all, but can still be meaningfully evaluated by the easier forms. Under perfectly stable conditions, s will reciprocate around a "threshold of pain" on some level.

Figure 2:
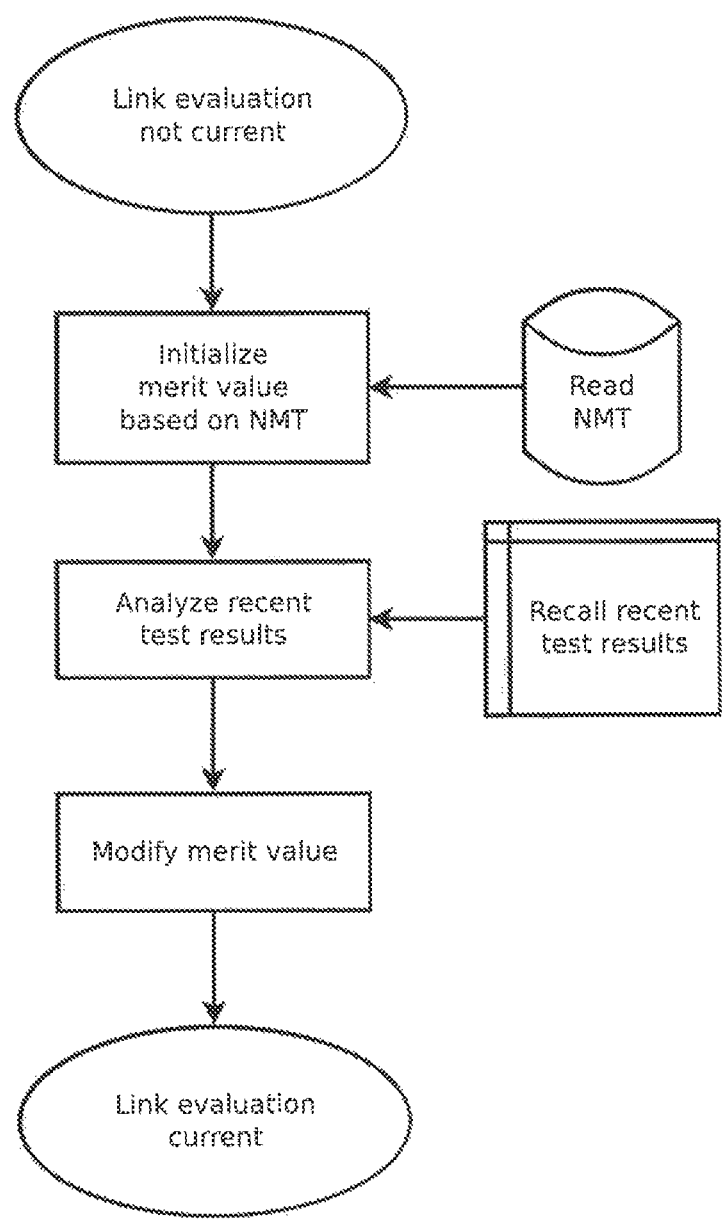
FIG. 2 is a schematic flow chart illustrating an evaluation sequence in accordance with one embodiment of the present invention.

In a further embodiment, continuing from the concrete example above, the adaptive ICMP test may be both affected by and manipulate the integer s such that 0≤s≤n. This value can also serve to influence the merit value of the link, as illustrated in FIG. 2. Given a base merit value $m_B$, based directly on the NMT assigned to the hardware substrate of the link for traffic in one direction, the effective merit value might then be $m_E = m_B \div 2^{(n-s)}$ in that direction. In this example, $m_E$ is ultimately used to compare different links in the routing portion of the invention.

Diagram 3 shows three links numbered 1, 2 and 3, having $m_E$ values proportioned as are 1, 5 and 2, respectively. As a direct result of having a lower NMT or having failed more tests, or both, link 1 is only half as likely as link 3 to receive a new stream of traffic.

Links may then be weighed against each other at least partly, and preferably entirely, by these merit values. Thus, in one embodiment, all streams to links may be assigned in linear proportion to the merit values of the links.

A similar methodology may also be used to re-assign data streams already assigned to a data link to another data link. This is particularly useful for lengthy data streams, such as telephone calls made by voice over IP, streaming media, video calls and the like. However, to avoid too much re-assignments, re-assignment to another data link is preferably only made when one or several predetermined criteria is/are met. For example, re-assignment may take place when one or several of the following conditions are fulfilled:

The presently used data link has failed.

A quality value, such as the above-discussed merit value, of the presently used data link has fallen below a predetermined minimum value.

The quality of the presently used link has been deteriorated to a predetermined extent in relation to other available data links. For example, it may be determined that the merit value of the presently used data link has fallen below a predetermined percentage, e.g. 50%, of the average merit value for all the presently available data links.

In addition to these various active call-and-response methods of link evaluation, there can be many other types. For instance, link merit values can be affected by the number of streams of traffic that are already being routed over the link, by the amount of data flowing as a result of these streams relative to the NMT, by the amount of network errors reported from lower (non-host) levels of abstraction by a network interface driver, etc. Such passive methods would have the advantage of being low in cost, because they do not add to data charges, and of not reducing performance by acting as overhead.

Alongside tests of likely performance, merit values can be adjusted according to arbitrary criteria, based on dynamic or static parameters, and obtainable by further tests or by receiving information from external sources. For example, to take cost into account, merit values can be adjusted without performing any tests at all. For instance, if link 1 is associated with a cost per unit of data sent over it, while link 2 is free, the merit value of link 1 can be reduced by 30% at all times, to meet a cost-benefit analysis.

Another type of embodiment would be to combine the advantages of active and passive tests by closely monitoring useful data sent by the router itself, or by its gateway, if it has one. For example, if the router reports data usage by each of its clients on the local network to a central server, the size of each such report and the time required to send it across a specific link can itself be used as a test of that link. If the router does operate with a gateway, the specific protocol needed to coordinate routing optimizations between the router and the gateway can be expanded to include mutual feedback on data sent and received since the last exchange, taking any negative discrepancies therein, or high latency, as a sign of trouble.

Yet another type of embodiment with respect to evaluation would be to take precise measurements of latency into account. Some networking applications are more sensitive to responsiveness than to bandwidth, one example being the loading of a web page containing only dozens of small resources, such as low-resolution images, CSS files and short scripts. In the optimization of performance for such applications, latencies significantly lower than the three-second floor used in the ICMP timeout example above are relevant. Therefore, merit values can be given a further adjustment according to the findings of the last few successful ICMP requests, the precise time needed to complete a DNS query, etc.

Moving on from the subject of link evaluation, there can also be numerous embodiments of the second part of the invention, which is to optimize the assignment of streams to data links. Given that the process of link evaluation produces scalar merit values for each link, the assignment can be accomplished by any of several very common shuffling and selection algorithms known in computer science, provided the requirements of the invention are met. For instance, treating merit values as fitness, a genetic algorithm may be applied, such as tournament selection, to choose a link for each new stream. However, the algorithm does not need to be literally random. It can be seeded with the array of key-value pairs formed by the set of links and their merit values, producing a deterministic system that is easier to troubleshoot.

In the case of fine-tuned evaluation for specific use cases, such as the precise measurements of latency mentioned above, an embodiment of this invention may attempt to determine the special needs of each new stream of traffic. For example, a stream that looks typical of voice over IP (VOIP), judging by its port numbers, its contents, or other factors, can be assigned to a link with especially low latency. A stream that looks typical of on-demand, non-live video streaming, which is less sensitive to latency, can be routed with emphasis on bandwidth. Such an embodiment of this invention may require several parallel implementations of its ideas, maintaining records of separate merit values for separate applications, and routing each stream according to the type of its source, however this knowledge is obtained.

The invention has now been described with reference to specific embodiments. However, several variations of the communication system are feasible. For example, other test(s) generating a predictable response are useable, assignment of data streams to data links may, based on the evaluation and tests, be performed in various ways, and may also include other parameters, etc. Further, the communication system may be used on various types of vehicles. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A method for wireless communication between a moving vehicle and a remote server through at least one exterior mobile network, said at least one exterior mobile network providing at least two concurrently useable data links, comprising:

providing at least one router in the moving vehicle for receiving and transmitting wireless data communication to and from a stationary communication server outside said moving vehicle through said at least one exterior mobile network;

evaluating, by a controller, the quality of said data links on a host layer by repeatedly sending requests arranged to trigger a determinable automated response to said stationary communication server via said data links, and measure the time until the triggered automated responses are received; and assigning, by the controller, data streams to said data links at least partly based on said evaluated quality.

2. The method of claim 1, wherein the requests triggering a determinable automated response are requests to a domain name system (DNS) server.

3. The method of claim 1, wherein the request triggering a determinable automated response uses the ICMP protocol.

4. The method of claim 3, wherein the requests triggering a determinable automated response are ECHO_REQUEST datagrams, used to trigger an ECHO_RESPONSE from an arbitrary remote host.

5. The method of claim 4, wherein the ECHO_REQUESTs are provided with a variable amount of extra padding data.

6. The method of claim 1, wherein the evaluation is made based on an average time for a predetermined number of requests to said stationary communication server via said data links for said automated response to be received, said predetermined number of requests being in the range of 3-10 requests.

7. The method of claim 1, wherein the requests to said stationary communication server are sent at least every 5 seconds.

8. The method of claim 1, wherein the frequency of sending requests to said stationary communication server is adjustable in accordance with at least one other quality parameter of the links.

9. The method of claim 1, further comprising determining a merit value to each of said data links, based on the evaluated quality of said data links, wherein the assignment of data streams to the data links is made in proportion to the determined merit values.

10. The method of claim 9, wherein the merit values are also based on the nominal maximum throughput (NMT) of the links.

11. The method of claim 9, wherein separate merit values are determined for each direction of traffic of each link.

12. The method claim 1, wherein the assignment of data streams to the data links based on said evaluated quality occurs randomly or pseudo-randomly.

13. A wireless communication system for a moving vehicle, comprising:

at least one router in the moving vehicle for receiving and transmitting wireless data communication to and from a stationary communication server outside said moving vehicle through at least one exterior mobile network, wherein said at least one exterior mobile network provides at least two concurrently useable data links, and at least one controller arranged to evaluate the quality of said data links on a host layer, and to assign data streams to said data links at least partly based on said evaluated quality, wherein said evaluation is made on a host layer, and is based on measured times until automated response are received from requests arranged to trigger a determinable automated response repeatedly sent to said stationary communication server via said data links.

* * * * *